(12) United States Patent
Kim et al.

(10) Patent No.: US 10,196,550 B2
(45) Date of Patent: Feb. 5, 2019

(54) LIQUID CRYSTAL ELEMENT

(71) Applicant: LG Chem, Ltd., Seoul (KR)

(72) Inventors: Jin Hong Kim, Daejeon (KR); Jung Woon Kim, Daejeon (KR); Dong Hyun Oh, Daejeon (KR); Jung Sun You, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/126,514

(22) PCT Filed: Apr. 6, 2015

(86) PCT No.: PCT/KR2015/003409
§ 371 (c)(1),
(2) Date: Sep. 15, 2016

(87) PCT Pub. No.: WO2015/152694
PCT Pub. Date: Oct. 8, 2015

(65) Prior Publication Data
US 2017/0108740 A1    Apr. 20, 2017

(30) Foreign Application Priority Data

Apr. 4, 2014  (KR) .................. 10-2014-0040644
Apr. 6, 2015  (KR) .................. 10-2015-0048241

(51) Int. Cl.
*C09J 183/00*    (2006.01)
*G02F 1/1341*    (2006.01)
(Continued)

(52) U.S. Cl.
CPC .............. *C09J 183/00* (2013.01); *B32B 3/00* (2013.01); *B32B 7/10* (2013.01); *B32B 7/12* (2013.01);
(Continued)

(58) Field of Classification Search
CPC ................... G02F 1/13452; G02F 1/133345
See application file for complete search history.

(56) References Cited

U.S. PATENT DOCUMENTS 5,296,952 A * 3/1994 Takatsu ............... G02F 1/13476
                                                    349/77
5,579,140 A * 11/1996 Yamahara ......... G02F 1/133377
                                                    349/124

(Continued)

FOREIGN PATENT DOCUMENTS

EP    2692828 A1    2/2014
JP    H0695090 A    4/1994
(Continued)

OTHER PUBLICATIONS

International Search Report from PCT/KR2015/003409, dated Jul. 20, 2015.

*Primary Examiner* — Sang V Nguyen
(74) *Attorney, Agent, or Firm* — Lerner, David, Littenberg, Krumholz & Mentlik, LLP (57) ABSTRACT

The present application relates to a liquid crystal element and a use of the liquid crystal element. The exemplary liquid crystal element of the present application is, for example, an element capable of realizing a normally transparent mode, having a high contrast ratio, and being driven with a low driving voltage. Such a liquid crystal element may be applied in a variety of light modulators including a smart window, a window protective film, a flexible display element, an active retarder for displaying a 3D image and a viewing angle controlling film.

22 Claims, 4 Drawing Sheets (51) Int. Cl.

| | |
|---|---|
| *C09K 19/56* | (2006.01) |
| *C09J 5/00* | (2006.01) |
| *G02F 1/1333* | (2006.01) |
| *G02F 1/1334* | (2006.01) |
| *B32B 7/12* | (2006.01) |
| *B32B 7/10* | (2006.01) |
| *B32B 23/04* | (2006.01) |
| *B32B 27/08* | (2006.01) |
| *B32B 27/28* | (2006.01) |
| *B32B 27/30* | (2006.01) |
| *B32B 27/32* | (2006.01) |
| *B32B 27/36* | (2006.01) |
| *B32B 3/00* | (2006.01) |
| *C09D 183/04* | (2006.01) |
| *C09K 19/54* | (2006.01) |

(52) U.S. Cl.
CPC .............. *B32B 23/04* (2013.01); *B32B 27/08* (2013.01); *B32B 27/281* (2013.01); *B32B 27/286* (2013.01); *B32B 27/306* (2013.01); *B32B 27/308* (2013.01); *B32B 27/32* (2013.01); *B32B 27/325* (2013.01); *B32B 27/36* (2013.01); *B32B 27/365* (2013.01); *C09D 183/04* (2013.01); *C09J 5/00* (2013.01); *C09K 19/56* (2013.01); *G02F 1/1334* (2013.01); *G02F 1/1341* (2013.01); *G02F 1/133377* (2013.01); *B32B 2250/02* (2013.01); *B32B 2255/10* (2013.01); *B32B 2255/26* (2013.01); *B32B 2307/40* (2013.01); *B32B 2307/50* (2013.01); *B32B 2307/538* (2013.01); *B32B 2457/20* (2013.01); *C09K 2019/546* (2013.01)

(56) References Cited

U.S. PATENT DOCUMENTS

| | | | |
|---|---|---|---|
| 6,249,332 B1 * | 6/2001 | Bryan-Brown | G02F 1/13378 349/128 |
| 2002/0188053 A1 * | 12/2002 | Zang | C09J 153/00 524/474 |
| 2003/0184692 A1 * | 10/2003 | Nagae | G02F 1/133514 349/86 |
| 2004/0136048 A1 * | 7/2004 | Arango | B41J 2/01 359/296 |
| 2004/0165126 A1 * | 8/2004 | Ooi | G02B 5/1814 349/96 |
| 2006/0035086 A1 * | 2/2006 | Amos | G02F 1/133711 428/411.1 |
| 2006/0262249 A1 * | 11/2006 | Liang | G02F 1/133377 349/86 |
| 2007/0042135 A1 * | 2/2007 | Liang | G02F 1/133377 428/1.1 |
| 2007/0173166 A1 * | 7/2007 | Ding | G02F 1/1339 445/25 |
| 2007/0236631 A1 * | 10/2007 | Ohtani | G02B 1/111 349/96 |
| 2008/0020007 A1 * | 1/2008 | Zang | A61K 8/0295 424/401 |
| 2008/0036960 A1 * | 2/2008 | Ding | G02F 1/133377 349/156 |
| 2008/0094551 A1 * | 4/2008 | Hayashi | G02F 1/13475 349/106 |
| 2008/0174707 A1 | 7/2008 | Iwamoto et al. | |
| 2008/0278643 A1 * | 11/2008 | Iwamoto | G02F 1/1337 349/36 |
| 2010/0026946 A1 | 2/2010 | Iwamoto | |
| 2010/0260030 A1 * | 10/2010 | Tao | G02B 5/1828 369/112.02 |
| 2011/0157531 A1 * | 6/2011 | Suwa | C09K 19/56 349/124 |
| 2011/0261303 A1 * | 10/2011 | Jang | G02F 1/13318 349/108 |
| 2012/0088320 A1 * | 4/2012 | Hwang | B29D 11/00788 438/27 |
| 2013/0319275 A1 * | 12/2013 | Fohrenkamm | B41M 1/04 101/483 |
| 2014/0240627 A1 * | 8/2014 | Wu | G02F 1/133504 349/16 |
| 2014/0340617 A1 * | 11/2014 | Yanai | G02F 1/133634 349/96 |
| 2014/0357012 A1 * | 12/2014 | Toriyama | G02B 1/12 438/71 |
| 2017/0133638 A1 * | 5/2017 | Takahashi | H01L 51/5275 |

FOREIGN PATENT DOCUMENTS

| | | | | |
|---|---|---|---|---|
| JP | 2006-085068 | * | 3/2006 | ............... G02F 1/13 |
| JP | 2006085068 A | | 3/2006 | |
| JP | 2007065286 A | | 3/2007 | |
| JP | 2008180886 A | | 8/2008 | |
| JP | 2008276003 A | | 11/2008 | |
| JP | 2008281752 A | | 11/2008 | |
| JP | 2009544060 A | | 12/2009 | |
| JP | 2010039120 A | | 2/2010 | |
| KR | 19930013794 | | 7/1993 | |
| KR | 20100100900 A | | 9/2010 | |
| KR | 20120022617 A | | 3/2012 | |
| KR | 20130129120 A | | 11/2013 | |
| WO | 2011115118 A1 | | 9/2011 | |
| WO | 2012133445 A1 | | 10/2012 | |
| WO | 2014030926 A1 | | 2/2014 | |

* cited by examiner

LIQUID CRYSTAL ELEMENT

CROSS-REFERENCE TO RELATED APPLICATION

This application is a national phase entry under 35 U.S.C. § 371 of International Application No. PCT/KR2015/003409, filed Apr. 6, 2015, which claims priority to Korean Patent Application No. 10-2014-0040644, filed Apr. 4, 2014 and Korean Patent Application No. 10-2015-0048241, filed Apr. 6, 2015, the disclosures of which are incorporated herein by reference.

TECHNICAL FIELD

The present application relates to a liquid crystal element and a use of the liquid crystal element.

BACKGROUND ART

A liquid crystal display (LCD) displays images by aligning a liquid crystal compound in a predetermined direction, and switching the alignment through application of a voltage. A process of manufacturing an LCD is a complicated and high-cost process, and needs a large-scale production line and large-scale equipment.

A polymer dispersed liquid crystal ((PDLC), which is the generic concept encompassing a so-called polymer network liquid crystal (PNCL) and polymer stabilized liquid crystal (PSLC)) element, which is realized by dispersing a liquid crystal in a polymer matrix, has been known. The PDLC is able to be manufactured by coating a liquid crystal solution, and thus can be manufactured by a simpler method than that for a conventional LCD.

As disclosed in Patent Document 1 (Korean Unexamined Patent Application No. 1993-0013794), a liquid crystal compound is not generally aligned in PDLC. For this reason, the PDLC is opaque when a voltage is not applied, and such a state is called a scattering mode. When a voltage is applied to PDLC, the liquid crystal compound is arranged and thus becomes transparent. Therefore, switching between a transparent mode and a scattering mode is able to be performed.

However, since such a PDCL mode exhibits a scattering state in the initial state before a voltage is applied, to maintain transparency, the voltage has to be always applied to a cell, and thus there is high power consumption.

DISCLOSURE

Technical Problem

The present application provides a liquid crystal element and a use of the liquid crystal element.

Technical Solution

An exemplary liquid crystal element of the present application includes a first substrate on which a mold layer is formed, and a second substrate on which a resin layer is formed. The mold layer may have a convex part and a concave part. Also, the second substrate may be disposed such that the resin layer is in contact with a convex part of the mold layer. In one example, the resin layer may have surface characteristics which may induce vertical alignment with respect to the liquid crystal compound. The liquid crystal element may also include a liquid crystal compound present in a concave part of the mold layer.

Figure 1:
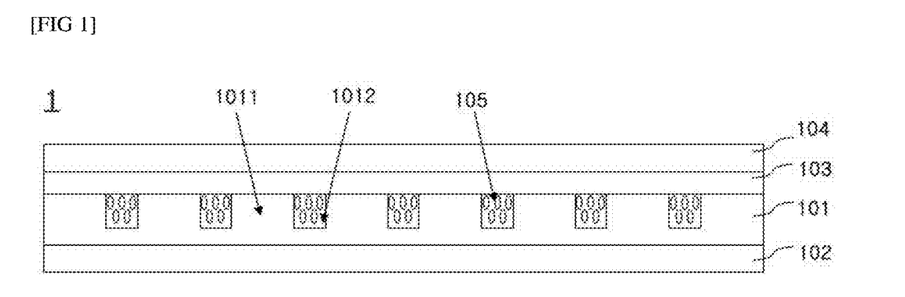
FIG. 1 is a schematic diagram of an exemplary liquid crystal element.

FIG. 1 is a schematic diagram of an exemplary liquid crystal element of the present application. The liquid crystal element 1 of FIG. 1 includes a first substrate 102 on which a mold layer 101 having a convex part 1011 and a concave part 1012 is formed, a second substrate 104 on which a resin layer 103 is formed to be in contact with the convex part 1011 of the mold layer, and a liquid crystal compound 105 present in the concave part 1012 of the mold layer. As shown in FIG. 1, in the liquid crystal element, the liquid crystal compound may be divided by a barrier rib formed with the concave part of the mold layer and one surface of the resin layer.

In one example, the mold layer may include a crosslinkable or polymerizable compound. In the specification, the polymerizable or crosslinkable compound may refer to a compound having a polymerizable or crosslinkable functional group. The mold layer may include, for example, a crosslinkable or polymerizable compound in a crosslinked or polymerized state. In the specification, the polymerizable or crosslinkable functional group may be, for example, an alkenyl group, an epoxy group, a cyano group, a carboxyl group, a (meth)acryloyl group or a (meth)acryloyloxy group, but the present application is not limited thereto. When the mold layer includes a crosslinkable or polymerizable material, the mold layer may exhibit excellent adhesion to the resin layer.

In one example, as the crosslinkable or polymerizable compound, an acrylate compound may be used. In the specification, the acrylate compound may be a compound having an acryloyl or methacryloyl group as a functional group. A compound having one of the functional groups may be a monofunctional acrylate compound, and a compound having two or more of the functional groups may be a multifunctional acrylate compound. For convenience of distinction, hereinafter, the compound having two functional groups is referred to as a bifunctional acrylate compound, and the tri- or higher functional acrylate compound, for example, having three or more functional groups is simply referred to as a multifunctional acrylate compound. The multifunctional acrylate compound may include, for example, 3 to 8, 3 to 7, 3 to 6, 3 to 5, or 3 to 4 functional groups.

For example, as the monofunctional acrylate compound, a compound represented by Formula 1 may be used.

[Formula 1]

In Formula 1, R is hydrogen or an alkyl group having 1 to 4 carbon atoms, and X is an alkyl group having 1 to 20 carbon atoms.

Also, as the bifunctional acrylate compound, a compound represented by Formula 2 may be used.

[Formula 2]

In Formula 2, R is each independently hydrogen or an alkyl group having 1 to 4 carbon atoms, and X is an alkylene or alkylidene group having 1 to 20 carbon atoms.

Also, as a multifunctional acrylate compound, a compound represented by Formula 3 may be used.

[Formula 3]

In Formula 3, n is a number greater than or equal to 3, m is a number ranging from 0 to 5, R is each independently hydrogen or an alkyl group having 1 to 4 carbon atoms, X is a (m+n) valent radical, and Y is hydrogen or an alkyl group.

In Formulas 1 to 3, as an alkyl group which may be present in R or Y, a methyl group or an ethyl group may be used.

In Formula 1, an alkyl group of X may be, for example, a linear or branched alkyl group having 1 to 20, 1 to 16, 1 to 12, 4 to 12, or 6 to 12 carbon atoms.

In Formula 2, an alkylene or alkylidene group of X may be, for example, an alkylene or alkylidene group having 1 to 16, 1 to 12, 1 to 10, 1 to 8, 2 to 8, or 4 to 8 carbon atoms. The alkylene or alkylidene group may be, for example, linear, branched or cyclic.

Meanwhile, in Formula 3, n is a number greater than or equal to 3, and may be in the range of 3 to 8, 3 to 7, 3 to 6, 3 to 5, or 3 to 4. Also, in Formula 2, m may be a number ranging from 0 to 5, 0 to 4, 0 to 3, 0 to 2, or 0 to 1.

In Formula 3, X may be a (m+n) valent radical, for example, a hydrocarbon having 2 to 20, 2 to 16, 2 to 12, 2 to 8, or 2 to 6 carbon atoms, which is, specifically, a (m+n) valent radical derived from a linear or branched alkane.

A substituent defined in Formulas 1 to 3, for example, an alkyl group, an alkylene group, an alkylidene group or a (m+n) valent radical, may be, as necessary, substituted by one or more substituents. Here, the substituent may be, for example, an alkyl group, an alkoxy group, an epoxy group, an oxo group, an oxetanyl group, a thiol group, a cyano group, a carboxyl group, or an aryl group, but the present application is not limited thereto.

In another example, the mold layer may include a curable compound. In the specification, the curable compound may refer to a compound having a curable functional group. The mold layer may include, for example, a curable compound in a cured state. A type of the curable compound is not particularly limited, and may be suitably selected without impairing the object of the present application. For example, the curable compound may be a heat-curable compound or photocurable compound. In a specific example, the mold layer may include a curable silicone compound to effectively induce vertical alignment with respect to the liquid crystal compound present in a concave part. Specific details for the curable silicone compound may be the same as those for a resin layer which will be described below.

Surface characteristics of the mold layer may be suitably adjusted without impairing the object of the present application. In one example, the mold layer may have the following surface characteristics such that vertical alignment of the liquid crystal compound present in the concave part is effectively induced. The surface characteristics of the mold layer may be changed, for example, according to the shape of the concave and convex parts of the mold layer, and may be surface characteristics for the mold layer in a planar state before the concave and convex parts of the mold layer are formed.

The mold layer may satisfy, for example, the condition of General Equation 1.

$$0 \le |Y - \{1 \times 10^{-4} X^{-3} - 1.2 \times 10^{-3} X^{-2} + 3.1 \times 10^{-3} X - 1.6 \times 10^{-3}\}| \le 0.05 \quad \text{[General Equation 1]}$$

In General Equation 1, X is an AFM Z-scale surface roughness of the mold layer, and Y is a surface polarity of the mold layer. The surface energy ($\gamma^{surface}$) of the mold layer may be calculated by considering the dispersion force between non-polar molecules and the interactive force between polar molecules ($\gamma^{surface} = \gamma^{dispersion} + \gamma^{polar}$), where, in the surface energy ($\gamma^{surface}$), a rate of the polar term ($\gamma^{polar}$) may be defined as polarity of its surface. By considering the relationship between the surface roughness and polarity of the mold layer to be General Equation 1, superior vertical alignment may be introduced to the liquid crystal compound while an external alignment power is not applied to the liquid crystal element.

The surface energy of the mold layer may be, for example, 5 to 100 mN/m, 8 to 80 mN/m, 10 to 50 mN/m, or 12 to 30 mN/m. Also, the polarity of the mold layer may be, for example, in the range of 0 to 0.5 or 0 to 0.4. Also, the AFM Z-scale surface roughness of the mold layer may be, for example, 0.1 to 50 nm, 0.2 to 30 nm, 0.3 to 10 nm, or 0.4 to 8 nm. Within these ranges of the surface energy, polarity or surface roughness, the mold layer may effectively induce the vertical alignment of the liquid crystal compound present in the concave part. However, the surface characteristics of the mold layer are not limited thereto, and may be suitably designed or changed according to a desired degree of vertical alignment of liquid crystals.

In the specification, the "surface energy" may be a value measured by a known method for measuring surface energy, for example, a value measured by the Owens-Wendt method using static contact angle measurement. As a specific example, the surface energy ($\gamma^{surface}$, mN/m) may be calculated by $\gamma^{surface} = \gamma^{dispersion} + \gamma^{polar}$, and may be measured using a drop shape analyzer (DSA100, KRUSS). The surface energy may be measured on a film formed by coating a substrate with a coating solution prepared by diluting a target sample to be measured in fluorobenzene at a concentration of a solid content of approximately 2 wt % to have a thickness of approximately 50 nm and a coating area (width: 2 cm, length: 2 cm) of 4 cm$^2$, drying the coated substrate at room temperature for approximately 1 hour, and thermally annealing the dried substrate at 160° C. for approximately 1 hour. An average of five values of contact angles is obtained by repeating a process of obtaining a contact angle five times after deionized water having a known surface tension is dropped on the thermally annealed film, and an average of five values of contact angles is obtained by repeating a process of obtaining a contact angle five times after diiodomethane having a known surface tension is dropped in the same manner as described above. Afterward, surface energy may be calculated by substituting a value of the surface tension (Strom value) of a solvent according to the Owens-Wendt-Rabel-Kaelble method using the average of the obtained contact angles with respect to the deionized water and diiodomethane. Also, in the specification, the "surface roughness" is a value measured by a known method for measuring an average surface roughness, for example, a value measured using multimode AFM equipment produced by Bruker.

A method for adjusting the surface characteristics of the mold layer as described above is not particularly limited. For example, a material having the surface characteristics may be selected as a material for the mold layer, an additive providing the surface characteristics to the mold layer may be added, or a manufacturing process may be controlled to allow the mold layer to have the surface characteristics. In one example, a curable silicone compound may be selected as a material for the mold layer, an additive introducing the surface characteristics to the mold layer may be added, or corona treatment may be performed on the mold layer. Conditions and a method for the corona treatment are not particularly limited, and may be suitably adjusted by considering the desired surface characteristics of the mold layer.

As a specific example, the mold layer may include a vertically-aligned polymer as an additive capable of inducing vertical alignment. As a vertically-aligned polymer, for example, a polymer of a polymerization unit including a linear hydrocarbon group having 4, 5, 6, 7, 8, 9 or 10 or more carbon atoms at a terminal end may be used. In the specification, the "hydrocarbon group" may refer to an organic compound consisting of carbon and hydrogen, and unless particularly mentioned otherwise, may be an alkyl group, an alkenyl group, an alkynyl group or an aryl group. Also, in the specification, the "linear hydrocarbon group" may refer to a hydrocarbon group having a structure in which several atoms are connected in a long row. Here, the upper limit of the carbon atoms in the linear hydrocarbon group is not particularly limited, and the linear hydrocarbon group may have, for example, 24, 22, 20, 18 or 16 or less carbon atoms. Alternatively, as a vertically-aligned polymer, for example, a polymer including chlorine (Cl), fluorine (F) or silicon (Si), more specifically, a polymer of a polymerization unit including a chlorine (Cl)-, fluorine (F)- or silicon (Si)- substituted hydrocarbon group may be used. Here, the hydrocarbon group may be, for example, an alkyl group having one carbon atom, an alkyl, alkenyl or alkynyl group having 2 or more carbon atoms, a cycloalkyl group having 3 or more carbon atoms, or an aryl group having 6 or more carbon atoms.

As a specific example, as a vertically-aligned polymer, polymethyl methacrylate, an acrylic acid/methacrylic acid copolymer, a styrene/maleimide copolymer, polyvinylalcohol, modified polyvinylalcohol, poly(N-methylol acrylamide), a styrene/vinyl toluene copolymer, chlorosulfonated polystyrene, nitrocellulose, polyvinyl chloride, polyolefin chloride, polyester, polyimide, a vinyl acetate/vinyl chloride copolymer, an ethylene/vinyl acetate copolymer, carboxymethyl cellulose, polyethylene, polypropylene or polycarbonate may be used, but the present application is not limited thereto.

As a specific example, the mold layer may include a vertically-aligned polymer including a polymerization unit derived from a compound of Formula 4 as follows:

[Formula 4]

In Formula 4, $R_1$ to $R_9$ are each independently hydrogen, an alkyl group, an alkenyl group, an alkynyl group or an alkoxy group, and A is a single bond, an alkylene group or an alkylidene group. Here, in the case that $R_5$ to $R_9$ are halogen atoms, a halogen-substituted alkyl, alkenyl, alkynyl or alkoxy group may be excluded.

In the specification, the term "single bond" refers that a specific atom is not present in a part represented by A. For example, in Formula 1, when A is a single bond, a structure in which benzene and oxygen are directly connected may be formed at both sides of A.

Also, the vertically-aligned polymer may include a polymerization unit derived from a compound of Formula 5, but the present application is not limited thereto.

[Formula 5]

In Formula 5, $R_{10}$ may be hydrogen, an alkyl group, an alkenyl group, an alkynyl group, or an aryl group.

Also, the vertically-aligned polymer may include a polymerization unit derived from a compound of Formula 6, but the present application is not limited thereto.

[Formula 6]

In Formula 6, $R_{11}$ to $R_{16}$ are each independently hydrogen, an alkyl group, an alkenyl group, an alkynyl group, an alkoxy group or —O-Q-P, and at least one of $R_{11}$ to $R_{16}$ is —O-Q-P, or at least one of $R_{11}$ to $R_{16}$ is a halogen-substituted alkyl group, a halogen-substituted alkenyl group, a halogen-substituted alkynyl group or a halogen-substituted alkoxy group. Here, Q is an alkylene or alkylidene group, and P is an acryloyl group, a methacryloyl group, an acryloyloxy group or a methacryloyloxy group.

When the mold layer contains a vertically-aligned polymer, the content of the vertically-aligned polymer in the mold layer may be suitably selected without impairing the object of the present application. For example, a solid content of the vertically-aligned polymer of the mold layer may be contained at 0.5 to 4.5 wt %, 1 to 4 wt %, 1.5 to 3.5 wt % or 2 to 3.2 wt %. In the specification, the solid content refers to a solid content at the time when the polymer is prepared in the form of a coating solution and thus applied in the process of forming the mold layer. When the content of the vertically-aligned polymer is in the above range, the mold layer may effectively realize the above-described vertical alignment characteristic.

The mold layer may be formed from a precursor, which includes the above-described compound, and as necessary, further includes an additive such as a solvent, a radical or cationic initiator capable of inducing crosslinking or polymerization of the crosslinkable or polymerizable compound, a basic material, another reactive compound capable of forming crosslinks or polymers, or a surfactant.

The mold layer may include a liquid crystal compound, for example, a reactive liquid crystal compound. Even in this case, a ratio of the liquid crystal compound is suitably adjusted to be a small amount. In one example, the absolute value of birefringence of the mold layer may be 30 or 20 nm or less. That is, the mold layer may be an isotropic mold layer, or a mold layer having birefringence in the above range. Therefore, even when the liquid crystal compound is included in the mold layer, it is better to be included in the range that exhibits the above-described birefringence. The birefringence may refer to, for example, an in-plane retardation calculated by Equation 1 or a retardation in a thickness direction calculated by Equation 2.

$$Rin = d \times (nx - ny) \quad \text{[Equation 1]}$$

$$Rth = d \times (nz - ny) \quad \text{[Equation 2]}$$

In Equations 1 and 2, Rin is an in-plane retardation, Rth is a retardation in a thickness direction, d is the thickness of the mold layer, nx is the refractive index in a slow axis direction in a plane of the mold layer, ny is the refractive index in the fast axis direction in a plane of the mold layer, and nz is the refractive index in the thickness direction of the mold layer.

The interval, width and thickness of the concave parts of the mold layer may be suitably adjusted by considering a region including the liquid crystal compound without impairing the object of the present application. For example, the interval between the concave parts may be in the range of 100 to 400 μm or 100 to 300 μm, the width may be in the range of 10 to 40 μm or 10 to 30 μm, and the height may be in the range of 10 to 30 μm or 10 to 20 μm, but the present application is not limited thereto.

The liquid crystal compound may be present in the concave part of the mold layer. As the liquid crystal compound, various types are able to be used without particular limitation as long as they can adjust the light modulation characteristic of the light crystal element since they can switch alignment. In the specification, the sentence "alignment is switchable" may refer to the arrangement direction of the liquid crystal compound being able to be changed by an external action such as the application of a voltage. As a liquid crystal compound, for example, a compound which can act in a transparent mode or mode having a suitable retardation along an alignment direction when liquid crystals are regularly arranged, and can induce the scattering of light through the action with the mold layer when the liquid crystals are not regularly aligned but randomly disposed may be used.

As the liquid crystal compound, for example, a smectic liquid crystal compound, a nematic liquid crystal compound or a cholesteric liquid crystal compound may be used. The liquid crystal compound may not be bound to the mold layer, and may be changed in alignment under an external action such as a voltage applied from an external environment. To this end, for example, the liquid crystal compound may be a compound which does not have a polymerizable or crosslinkable group. As necessary, the liquid crystal compound may be present in the concave part together with a small amount of the crosslinkable or polymerizable compound to achieve a suitable adhesive strength with respect to the resin layer. A type of the crosslinkable or polymerizable compound may be the same as described in the description of the mold layer. In this case, a content ratio of the crosslinkable or polymerizable compound may be suitably selected without impairing the object of the present application. The crosslinkable or polymerizable compound may be included, for example, at 10 to 15 parts by weight with respect to 100 parts by weight of the liquid crystal compound, but the present application is not limited thereto.

In one example, the liquid crystal compound present in the concave part of the mold layer may be aligned while an external action is not applied. The alignment direction of such an aligned liquid crystal compound may be changed by an external action. In the specification, the "external action" refers to all types of actions carried out to change the alignment or arrangement of the liquid crystal compound, for example, the application of a voltage. Also, in the specification, the "initial alignment" may refer to an alignment or arrangement direction of the liquid crystal compound without the external action, or an optical axis formed in the liquid crystal compound. In the liquid crystal element, the arrangement direction of the liquid crystal compound in the initial alignment state may be changed, and when the external action disappears, the liquid crystal compound may return to the initial alignment state.

In one example, the liquid crystal compound present in the concave part of the mold layer may be vertically aligned in the initial state. In the specification, the vertically-aligned state may refer to the case that the optical axis of a liquid crystal layer including the liquid crystal compound has a tilt angle of approximately 90 to 65 degrees, approximately 90 to 75 degrees, approximately 90 to 80 degrees, approximately 90 to 85 degrees, or approximately 90 degrees with respect to the plane of the liquid crystal layer. In the specification, the "optical axis" may refer to an axis in the major axis direction of the liquid crystal compound when the liquid crystal compound is in a rod shape, or an axis in the normal line direction of the plane when the liquid crystal compound is in a discotic shape.

The initial vertical alignment state of the liquid crystal compound may be changed by an external action, for example, the application of an external voltage. Therefore, the liquid crystal element may be maintained in a transparent mode in the initial state, and may be converted into various modes, other than a transparent mode, due to the external action. In one example, the liquid crystal element may be realized in an element which is capable of interchanging between a transparent mode and a scattering mode. For example, the liquid crystal element of the present application may be an element that is in a transparent mode since the liquid crystal compound is vertically aligned while there is no external action (that is, the initial state or normal state), is converted into a scattering mode since the liquid crystal compound is arranged in a random direction under an external action, and returns to the transparent mode when the external action is eliminated (such an element may generally be referred to as a transparent mode element for the sake of convenience).

A retardation (Rc) of the liquid crystal element may be suitably determined according to a mode or structure to be realized. For example, the region of the liquid crystal compound may have an in-plane retardation of 30 nm or less, and a retardation in a thickness direction of 500 nm or more in the initial state. The retardations in such ranges are suitable for realizing, for example, a normally transparent mode element. The retardation value may be the value measured with respect to light with a wavelength of 550 nm.

The resin layer disposed on the second substrate may have surface characteristics capable of inducing, for example, the vertical alignment of liquid crystals. In one example, the resin layer may have surface energy of 45 mN/m or less, 42.5 mN/m or less, 40 mN/m or less, 37.5 mN/m or less, 35 mN/m or less, 32.5 mN/m or less, or 30 mN/m or less. When the surface energy of the resin layer is in the above range, the vertical alignment may be effectively induced with respect to the liquid crystal compound present in the concave part of the mold layer. The lower limit of the surface energy of the resin layer may be, but is not particularly limited to, for example, more than 0 mN/m, 1 mN/m or more, 2 mN/m or more, 3 mN/m or more, 4 mN/m or more, or 5 mN/m or more.

Also, the resin layer may have an AFM Z-scale surface roughness of, for example, 2 nm or less, 1.9 nm or less, 1.8 nm or less, 1.7 nm or less, 1.6 nm or less, or 1.5 nm or less. When the surface roughness of the resin layer is in the above range, the vertical alignment of the liquid crystal compound present in the concave part of the mold layer may be effectively induced. The lower limit of the AFM Z-scale surface roughness of the resin layer may be, but is not particularly limited to, for example, more than 0 nm, 0.1 nm or more, 0.2 nm or more, 0.3 nm or more, or 0.4 nm or more.

Also, as necessary, the resin layer may satisfy the condition of General Equation 1, but the present application is not limited thereto.

$$0 = |Y - \{1 \times 10^{-4} X^{-3} - 1.2 \times 10^{-3} X^2 + 3.1 \times 10^{-3} X - 1.6 \times 10^{-3}\}| = 0.05 \quad \text{[General Equation 1]}$$

In General Equation 1, X is an AFM Z-scale surface roughness of the resin layer, and Y is a surface polarity of the resin layer. In this case, the surface polarity of the resin layer may be in the range of, for example, 0 to 0.5 or 0 to 0.4, but the present application is not limited thereto. Also, methods of measuring the surface energy, surface roughness and surface polarity of the resin layer may be the same as those described in the description of the mold layer.

A method for adjusting the surface characteristics of the resin layer as described above is not particularly limited. For example, as a material for the resin layer, a material capable of having the surface characteristics may be selected, an additive capable of having the surface characteristics may be added to the resin layer, or the manufacturing process may be controlled for the resin layer to have the surface characteristics. In one example, a curable silicone compound may be selected as a material for the resin layer, an additive capable of inducing vertical alignment may be added to the resin layer, or corona treatment may be performed on the mold layer. Conditions and a method for the corona treatment are not particularly limited, and may be suitably adjusted by considering the desired surface characteristics of the resin layer. Also, the additive capable of inducing the vertical alignment may be the same as described in the description of the mold layer.

In one example, the resin layer may include a curable compound. The resin layer may include the curable compound, for example, in a cured state. As a curable compound, for example, in one specific example, the resin layer may include a curable silicone compound in terms of effective induction of the vertical alignment of liquid crystals. The resin layer may include a curable silicone compound alone, or further include the crosslinkable or polymerizable compound described in the description of the mold layer. The resin layer may employ, for example, a heat-curable silicone compound or a UV-curable silicone compound. Hereinafter, the curable silicone compound will be described in detail.

In one aspect of the present application, the curable silicone compound is an addition-curable silicone compound, and may include (1) an organopolysiloxane containing two or more alkenyl groups in a molecule and (2) an organopolysiloxane containing two or more silicon-binding hydrogen atoms in a molecule. Such a silicone compound may form a cured product by an addition reaction, for example, in the presence of a catalyst which will be described below.

Here, the organopolysiloxane (1) is the main component constituting a silicone cured product includes at least two alkenyl groups in a molecule. Here, as a specific example of the alkenyl group, the organopolysiloxane (1) may include a vinyl group, an allyl group, a butenyl group, a pentenyl group, a hexenyl group or a heptenyl group, and preferably a vinyl group, but the present application is not limited thereto. In the organopolysiloxane (1), a binding site of the above-described alkenyl group is not particularly limited. For example, the alkenyl group may bind to a terminal end and/or side chain of a molecular chain. Also, the type of a substituent which may be included in the organopolysiloxane (1), other than the above-described alkenyl, may be an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; or a halogen-substituted alkyl group such as a chloromethyl group, a 3-chloropropyl group or a 3,3,3-trifluoropropyl group, and preferably a methyl or phenyl group, but the present application is not limited thereto.

Such a molecular structure of the organopolysiloxane (1) is not particularly limited, and may have any shape, for example, a linear, branched, cyclic, network or partially-branched linear shape. In the present invention, the organopolysiloxane (1) may have, particularly, a linear molecular structure among the above-described molecular structures, but the present application is not limited thereto. Meanwhile, in the present invention, in terms of the hardness and refractive index of the cured product, as the organopolysiloxane (1), an organopolysiloxane containing an aromatic group such as an aryl group or aralkyl group in a molecule may be used, but the present invention is not necessarily limited thereto.

A more specific example of the organopolysiloxane (1) which may be used in the present invention may be, but is not limited to, a dimethylsiloxane-methylvinylsiloxane copolymer in which both ends of the molecular chain are blocked with trimethylsiloxane groups, methylvinylpolysiloxane in which both ends of the molecular chain are blocked with trimethylsiloxane groups, a dimethylsiloxane-methylvinylsiloxane-methylphenylsiloxane copolymer in which both ends of the molecular chain are blocked with trimethylsiloxane groups, dimethylpolysiloxane in which both ends of the molecular chain are blocked with dimethylvinylsiloxane groups, methylvinylpolysiloxane in which both ends of the molecular chain are blocked with dimethylvinylsiloxane groups, a dimethylsiloxane-methylvinylsiloxane copolymer in which both ends of the molecular chain are blocked with dimethylvinylsiloxane groups, a dimethylsiloxane-methylvinylsiloxane-methylphenylsiloxane copolymer in which both ends of the molecular chain are blocked with dimethylvinylsiloxane groups, an organopolysiloxane copolymer including a siloxane unit represented by $R^1_2SiO_{1/2}$, a siloxane unit represented by $R^1_2R^2SiO_{1/2}$ and a siloxane unit represented by $SiO_{4/2}$, an organopolysiloxane copolymer including a siloxane unit represented by $R^1_2R^2SiO_{1/2}$ and a siloxane unit represented by $SiO_{4/2}$, an organopolysiloxane copolymer including a siloxane unit represented by $R^1R^2SiO_{2/2}$, and a siloxane unit represented by $R^1SiO_{3/2}$ or a siloxane unit represented by $R^2SiO_{3/2}$, or a mixture of two or more thereof. Here, $R^1$ may be, rather than an alkenyl group, a hydrocarbon group, which is specifically an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenethyl group; or a halogen-substituted alkyl group such as a chloromethyl group, a 3-chloropropyl group or a 3,3,3-trifluoropropyl group. Also, here, $R^2$ may be an alkenyl group, which is specifically a vinyl group, an allyl group, a butenyl group, a pentenyl group, a hexenyl group or a heptenyl group.

In one aspect of the present invention, the organopolysiloxane (1) may have a viscosity of 50 to 500,000 centipoises (cP), and preferably, 400 to 100,000 cP at 25° C. When the viscosity is less than 50 cP, the mechanical strength of a cured product of the silicone compound may be decreased, and the viscosity is more than 500,000 cP, handleability or workability may be degraded.

In the addition-curable silicone compound, the organopolysiloxane (2) may serve to crosslink the organopolysiloxane (1). In the organopolysiloxane (2), the binding position of a hydrogen atom may be, but is not particularly limited to, for example, an end and/or side chain of the molecular chain. Also, in the organopolysiloxane (2), a type of substituent which may be included in addition to the silicon-binding hydrogen atom may be, but is not particularly limited to, for example, as described in the organopolysiloxane (1), an alkyl group, an aryl group, an aralkyl group or a halogen-substituted alkyl group, and preferably a methyl group or a phenyl group, but the present invention is not limited thereto.

Meanwhile, a molecular structure of the organopolysiloxane (2) may be in any shape without particular limitation, for example, in a linear, branched, cyclic, network, or partially-branched linear shape. In the present invention, among the above molecular structures, particularly, a linear molecular structure is preferable, but the present invention is not limited thereto.

A more specific example of the organopolysiloxane (2) which may be used in the present invention may be methylhydrogenpolysiloxane in which both ends of the molecular chain are blocked with trimethylsiloxane groups, a dimethylsiloxane-methylhydrogen copolymer in which both ends of the molecular chain are blocked with trimethylsiloxane groups, a dimethylsiloxane-methylhydrogensiloxane-methylphenylsiloxane copolymer in which both ends of the molecular chain are blocked with trimethylsiloxane groups, dimethylpolysiloxane in which both ends of the molecular chain are blocked with dimethylhydrogensiloxane groups, a dimethylsiloxane-methylphenylsiloxane copolymer in which both ends of the molecular chain are blocked with dimethylhydrogensiloxane groups, methylphenylpolysiloxane in which both ends of the molecular chain are blocked with dimethylhydrogensiloxane groups, an organopolysiloxane copolymer including a siloxane unit represented by $R^1_3SiO_{1/2}$, a siloxane unit represented by $R^1_2HSiO_{1/2}$, and a siloxane unit represented by $SiO_{4/2}$, an organopolysiloxane copolymer including a siloxane unit represented by $R^1_2HSiO_{1/2}$ and a siloxane unit represented by $SiO_{4/2}$, an organopolysiloxane copolymer including a siloxane unit represented by $R^1HSiO_{2/2}$ and a siloxane unit represented by $R^1SiO_{3/2}$ or a siloxane unit represented by $HSiO_{3/2}$, and a mixture of two or more thereof, but the present invention is not limited thereto. Here, $R^1$ is a hydrocarbon group except an alkenyl group, and specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or phenentyl group; or a halogen-substituted alkyl group such as a chloromethyl group, a 3-chloropropyl group or a 3,3,3-trifluoropropyl group.

In one aspect of the present invention, the organopolysiloxane (2) may have a viscosity of 1 to 500,000 cP, and preferably, 5 to 100,000 cP at 25° C. When the viscosity is less than 1 cP, the mechanical strength of a cured product of the silicone compound may be decreased, and the viscosity is more than 500,000 cP, handleability or workability may be degraded.

In one aspect of the present invention, the content of the organopolysiloxane (2) is not particularly limited as long as it is included to be properly cured. For example, the organopolysiloxane (2) may include 0.5 to 10 silicon-binding hydrogen atoms with respect to one alkenyl group included in the above-described organopolysiloxane (1). When the number of the silicon atom-binding hydrogen atoms is less than 0.5, the curable silicone compound may not be sufficiently cured, and when the number of the silicon atom-binding hydrogen atoms is more than 10, thermal resistance of the cured product may be decreased. Meanwhile, in the present invention, in terms of the hardness and refractive index of the cured product, as the organopolysiloxane (2), an organopolysiloxane (2) containing an aromatic group such as an aryl or aralkyl group in a molecular structure may be used, but the present invention is not limited thereto.

In one aspect of the present invention, the addition-curable silicone compound may further include platinum or a platinum compound as a catalyst for curing. As a specific example of the platinum or platinum compound, fine platinum powder, platinum black, platinum-loaded silica fine powder, platinum-loaded activated carbon, chloroplatinic acid, platinum tetrachloride, an alcohol solution of chloroplatinic acid, a complex of platinum and an olefin, a complex of platinum and an alkenylsiloxane such as 1,1,3,3-tetramethyl-1,3-divinyldisiloxane, or fine powder of a thermoplastic resin (polystyrene resin, nylon resin, polycarbonate resin, silicone resin, etc.) having a particle diameter of less than 10 μm, which contains platinum or a platinum compound, but the present invention is not limited thereto.

A content of the above-described catalyst in the addition-curable silicone compound of the present invention is not particularly limited, and may be, for example, 0.1 to 500 ppm, and preferably, 1 to 50 ppm with respect to the weight unit of the total compound. When the content of the catalyst is less than 0.1 ppm, curing of the composition may be degraded, and when the content of the catalyst is more than 500 ppm, economic feasibility may be degraded.

In one aspect of the present invention, in terms of enhancement of storage stability, handleability and workability, the addition-curable silicone compound may further include an alkyne alcohol such as 3-methyl-1-butyne-3-ol, 3,5-dimethyl-1-hexyne-3-ol or phenylbutynol; an enyne compound such as 3-methyl-3-pentene-1-yne, or 3,5-dimethyl-3-hexene-1-yne; a curing inhibitor such as 1,2,5,7-tetramethyl-1,3,5,7-tetravinylcyclotetrasiloxane, 1,3,5,7-tetramethyl-1,3,5,7-tetrahexenylcyclotetrasiloxane or benzotriazol. A content of the curing inhibitor may be suitably selected without impairing the object of the present invention, and may be, for example, 10 to 50,000 ppm based on the weight.

In another aspect of the present invention, the silicone compound is a condensation-curable silicone compound, and may include, for example, (a) an alkoxy group-containing siloxane polymer; and (b) a hydroxide group-containing siloxane polymer.

The (a) siloxane polymer which may be used in the present invention may be, for example, a compound represented by Formula 7.

$$R^1{}_aR^2{}_bSiO_c(OR^3)_d \quad \text{[Formula 7]}$$

In Formula 7, $R^1$ and $R^2$ are each independently a hydrogen atom or a substituted or unsubstituted monovalent hydrocarbon group, $R^3$ is an alkyl group, if there are a plurality of each of $R^1$, $R^2$ and $R^3$, they may be the same or different from each other, a and b are each independently 0 or more, and less than 1, a+b is more than 0 and less than 2, c is more than 0 and less than 2, d is more than 0 and less than 4, and a+b+c×2+d is 4.

In the present invention, also, the siloxane polymer represented by Formula 7 may have a weight average molecular weight converted to polystyrene of 1,000 to 100,000, preferably 1,000 to 80,000, and more preferably 1,500 to 70,000, as measured by gel permeation chromatography. As the weight average molecular weight of the (a) siloxane polymer is in the above range, a preferable cured product may be obtained without a defect such as a crack during the preparation of a silicone cured product.

In the definition of Formula 7, monovalent hydrocarbon may be, for example, an alkyl group having 1 to 8 carbon atoms, a phenyl group, a benzyl group or a tolyl group, and the alkyl group having 1 to 8 carbon atoms may be a methyl group, an ethyl group, a propyl group, an isopropyl group, a butyl group, a pentyl group, a hexyl group, a heptyl group or an octyl group. Also, in the definition of Formula 7, the monovalent hydrocarbon group may be substituted with a known substituent such as a halogen, an amino group, a mercapto group, an isocyanate group, a glycidyl group, a glycidoxy group or an ureido group.

Also, in the definition of Formula 7, an example of the alkyl group of $R^3$ may be a methyl group, an ethyl group, a propyl group, an isopropyl group or a butyl group. Among these alkyl groups, a methyl group or an ethyl group may be used, but the present application is not limited thereto.

In the present invention, among the polymers of Formula 7, a branched or triple crosslinked siloxane polymer may be used. Also, in the (a) siloxane polymer, without impairing the object of the present invention, specifically, a hydroxide group may remain without inhibiting dealcoholization.

The (a) siloxane polymer may be prepared by hydrolyzing and condensing, for example, a multifunctional alkoxysilane or multifunctional chlorosilane. A suitable multifunctional alkoxysilane or chlorosilane may be easily selected according to a desired (a) siloxane polymer by one of ordinary skill in the art, and conditions for hydrolysis and condensation using the multifunctional alkoxysilane or chlorosilane may be easily controlled. Meanwhile, in the preparation of the (a) siloxane polymer, according to a purpose, a suitable monofunctional alkoxysilane may also be used.

As the (a) siloxane polymer, for example, a commercially-available organosiloxane polymer such as X40-9220 or X40-9225 manufactured by Shin-Etsu Silicone, or XR31-B1410, XR31-B0270 or XR31-B2733 manufactured by GE-Toray Silicone may be used. Meanwhile, in the present invention, in terms of the hardness and refractive index of the cured product, as the (a) organopolysiloxane, an (a) organopolysiloxane containing an aromatic group such as an aryl group or aralkyl group in a molecular structure may be used, but the present invention is not necessarily limited thereto.

Meanwhile, as the (b) hydroxide group-containing siloxane polymer included in the condensation-curable silicone compound, for example, a compound represented by Formula 8 may be used.

[Formula 8]

In Formula 8, $R_4$ and $R_5$ are each independently a hydrogen atom or a substituted or unsubstituted monovalent hydrocarbon group, and if there are a plurality of each of $R_5$ and $R_6$, they may be the same or different from each other, and n is an integer of 5 to 2,000.

In the definition of Formula 8, a specific type of the monovalent hydrocarbon group may be, for example, the same hydrocarbon group as used in Formula 7 described above.

In the present invention, the siloxane polymer of Formula 8 may have a weight average molecular weight converted to polystyrene of 500 to 100,000, preferably 1,000 to 80,000, and more preferably 1,500 to 70,000, as measured by gel transmission chromatography. Since the weight average molecular weight of the (b) siloxane polymer is in the above range, a proper cured product may be obtained without a defect such as a crack in the preparation of a silicone cured product.

The (b) siloxane polymer may be prepared by hydrolyzing and condensing, for example, dialkoxysilane and/or dichlorosilane. Suitable dialkoxysilane or dichlorosilane may be easily selected according to the desired (b) siloxane polymer by one of ordinary skill in the art, and conditions for hydrolysis and condensation using the dialkoxysilane or dichlorosilane may also be easily controlled. As such a (b) siloxane polymer, for example, a commercially available bifunctional organosiloxane polymer such as XC96-723, YF-3800, or YF-3804 manufactured by GE Toray Silicone may be used. Meanwhile, in the present invention, in terms of the hardness and refractive index of the cured product, as the organopolysiloxane (1), the organopolysiloxane (1) containing an aromatic group such as an aryl or aralkyl group in a molecular structure may be used, but the present invention is not necessarily limited thereto.

In one example, the resin layer and the convex part of the mold layer may be in contact by an adhesive strength, or the resin layer and the convex part of the mold layer may be crosslinked to each other. The resin layer and the convex part of the mold layer may exhibit a pressure-sensitive adhesive strength by the inclusion of the above-described curable compound. Alternatively, the resin layer and the mold layer may be in contact with each other by, for example, crosslinks between polymerizable, crosslinkable or curable functional groups remaining in the mold layer and the resin layer.

As one specific example, the resin layer disposed on the second substrate may exhibit an excellent adhesive strength with respect to the convex part of the adjacent mold layer and the liquid crystal compound. In one example, the 90-degree peel strength between the resin layer and the concave part of the mold layer may be, for example, 0.2 N/cm or more, 0.25 N/cm or more, or 0.3 N/cm or more, but the present invention is not limited thereto. An adhesive type of such a resin layer is not particularly limited, and may be suitably selected according to a desired use. For example, a solid, semi-solid, elastic or liquid adhesive resin layer may be suitably applied. A solid, semi-solid or elastic adhesive may be referred to as a so-called pressure sensitive adhesive (PSA), and may be cured before an adhesion target is laminated. The liquid adhesive may be referred to as a so-called optical clear resin (OCR), and may be cured after an adhesion target is laminated. According to an exemplary embodiment of the present application, as a PSA-type adhesive having a vertical alignment strength, a polydimethyl siloxane adhesive or a polymethylvinyl siloxane adhesive may be used, and as an OCR-type adhesive having a vertical alignment strength, an alkoxy silicone adhesive may be used, but the present application is not limited thereto.

The first substrate and the second substrate, which form the liquid crystal element, may be attached by a suitable adhesive strength required for forming a liquid crystal cell. Conventionally, in a liquid crystal element including a liquid crystal region which is phase-separated by polymerization of a polymer, the content of the polymer should be decreased to realize a normally transparent mode, and in this case, the adhesive strength required for forming a liquid crystal cell was not generated, and thus liquid crystals were leaked. However, since the liquid crystal compound is divided by a barrier rib formed with the concave part formed in the mold layer and the resin layer, and the first substrate and the second substrate are attached by a suitable adhesive strength, the liquid crystal element of the present application may have a high contrast ratio without the leakage of liquid crystals.

As the first substrate or second substrate, a known material may be used without particular limitation. For example, an inorganic or plastic film such as a glass film, a crystalline or non-crystalline silicon film, or a quartz or indium tin oxide (ITO) film may be used. As the base layer, an optically isotropic base layer or an optically anisotropic base layer such as a retardation layer may be used.

As the plastic base layer, triacetyl cellulose (TAC); a cyclo olefin copolymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); polyacrylate (Pac); poly ether sulfone (PES); polyetheretherketone (PEEK); polyphenylsulfone (PPS), polyetherimide (PEI); polyethylenenaphthatlate (PEN); polyethyleneterephtalate (PET); polyimide (PI); polysulfone (PSF); polyarylate (PAR) or an amorphous fluorine resin may be used, but the present application is not limited thereto. The base layer may include, as necessary, gold, silver, a coating layer of a silicon compound such as silicon dioxide or silicon monoxide, or a coating layer of an anti-reflective layer.

The liquid crystal element may further include an electrode layer. The electrode layer may be formed on a surface of the first substrate or second substrate, for example, a side surface of the mold layer or the resin layer. The electrode layer may be formed by depositing a metal oxide, for example, a conductive polymer, a conductive metal, a conductive nanowire or indium tin oxide (ITO). The electrode layer may be formed to have transparency. In this field, various materials and methods for forming a transparent electrode layer have been known, and any of these methods may be applied. If necessary, the electrode layer formed on the surface of the base layer may be suitably patterned.

The liquid crystal element may realize a normally transparent mode. Such a liquid crystal element may have a haze of, for example, 10% or less, 8% or less, 6% or less, or 5% or less in the initial state. The haze may be represented as a percentage of the transmittance of diffused light with respect to the transmittance of total transmitted light passing through a measurement target. The haze may be evaluated using a hazemeter (NDH-5000SP). The haze may be evaluated using the hazemeter by the method as follows. That is, light is transmitted through a measurement target and is incident into an integrating sphere. During the process, the light is divided into diffused light (DT) and parallel light (PT) by the measurement target, and these types of light are reflected in the integrating sphere and concentrated on a light receiving element, and the haze can be measured through the concentrated light. That is, throughout the procedure, total transmitted light (TT) is the sum (DT+PT) of the diffused light (DT) and the parallel light (PT), and a haze may be defined as a percentage (haze (%)=100×DT/TT) of the diffused light with respect to the total transmitted light. Also, such a liquid crystal element may exhibit excellent transparency when an external action is not applied. For example, the liquid crystal element may have light transmittance of 45% or more, 50% or more, 55% or more, or 60% or more in the initial state. The light transmittance may be a light transmittance for any one wavelength in the visible region, for example, in the wavelength range of approximately 400 to 700 nm.

The liquid crystal element is also able to be driven with, for example, a low driving voltage through low energy consumption. In the normally transparent mode element, a scattering mode may be realized by changing the arrangement direction of the liquid crystal compound by the application of a voltage, the liquid crystal element of the present application can reduce a driving voltage required in this procedure. Generally, when the normally-transparent-mode element is realized, reactive mesogens (RM) are used together with liquid crystals. In this case, due to a system for curing RM, anchoring with the liquid crystals is increased, and thus the driving voltage is increased. Meanwhile, in the liquid crystal element of the present application, since liquid crystals or liquid crystals and a small amount of a crosslinkable compound are injected into the concave part of the mold layer without using RM, the element is only influenced by an electric field applied from an external environment while being driven, and therefore the driving voltage is considerably decreased.

The liquid crystal element may also have a high contrast ratio. In the specification, the term "contrast ratio" may refer to a ratio (T/S) of brightness in the transparent mode (T) and brightness in a scattering mode (S). A higher contrast ratio represents excellent performance of the element, and the upper limit of the contrast ratio is not particularly limited. In the liquid crystal element of the present application, as described above, since the liquid crystal compound divided by the barrier rib formed with the concave part of the mold layer and the resin layer is in a high vertical alignment state, light leakage may be decreased and thus the liquid crystal element may exhibit the high contrast ratio.

Figure 2:
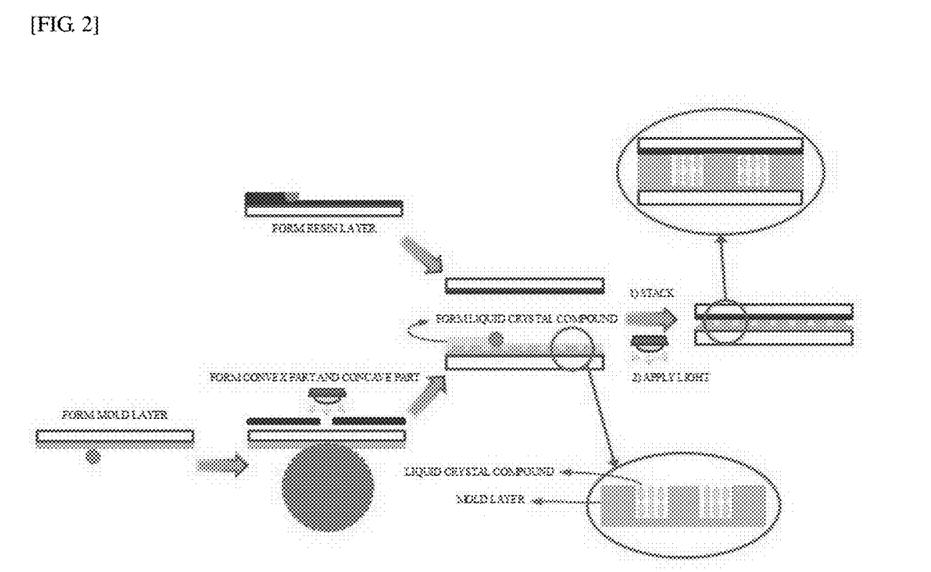
FIG. 2 shows a method for manufacturing an exemplary liquid crystal element.

The present application also relates to a method for manufacturing the liquid crystal element. An exemplary method for manufacturing the liquid crystal element includes injecting a liquid crystal compound into a concave part of a first substrate on which a mold layer having a convex part and a concave part is formed, and stacking a second substrate on which a resin layer having a surface energy of 45 mN/m or less and an AFM Z-scale surface roughness of 2 nm or less is formed on the first substrate to be in contact with the convex part of the mold layer. FIG. 2 is a schematic diagram illustrating an exemplary method for manufacturing a liquid crystal element. In the manufacturing method, specific details for the mold layer, the resin layer and the liquid crystal compound may be the same as those described in the description of the liquid crystal element.

The method for manufacturing a liquid crystal element includes forming a mold layer on the first substrate, and forming a convex part and a concave part in the mold layer. The mold layer may be formed, for example, by polymerizing or crosslinking and/or curing a layer formed by coating a composition for the mold layer including a polymerizable or crosslinkable compound, a curable compound and/or a vertically-aligned polymer on the first substrate. The polymerization or crosslinking may be performed by applying energy, for example, light suitable for inducing polymerization or crosslinking. Also, the application of energy for crosslinking or polymerization may be carried out by a process of suitably heat-drying a composition for the resin layer. The heat drying may be carried out at 70 to 250° C., 80 to 240° C., or 90 to 230° C. Drying time may be 1 to 60 minutes. As the drying temperature and time are controlled to the above ranges, the present application may effectively realize the desired surface characteristics of the mold layer.

A method for forming a composition for the resin layer on the first substrate is not particularly limited, and may be carried out by a known coating method, for example, roll coating, printing, inkjet coating, slit nozzling, bar coating, comma coating, spin coating or gravure coating.

The convex part and the concave part in the mold layer may be formed by, for example, an imprinting method. In this case, when the composition for forming the mold layer includes a solvent, the imprinting process may be carried out after the solvent is volatilized by drying the composition-coating layer under suitable conditions. The imprinting process may be carried out by a known method, for example, using a stamp or roller having a pattern capable of transferring desired convex and concave parts to the coating layer of the composition for the mold layer. In this case, the application of energy for crosslinking or polymerization of the mold layer may be carried out before, after or at the same time as the imprinting process. Conditions for the application of energy for polymerization or crosslinking, for example, the irradiation with light are not particularly limited as long as the mold layer is suitably cured to form the concave part and the convex part. As necessary, to accelerate the polymerization, application of suitable heat or exposure may be carried out before, after or at the same time as the application of light.

The method for manufacturing the liquid crystal element may also include injecting the liquid crystal compound into a concave part of the mold layer. The liquid crystal compound may be injected into the concave part by coating a top surface of the mold layer having a concave part and a convex part with the liquid crystal composition including the liquid crystal compound. A layer of the composition including the liquid crystal compound may be formed by a conventional coating method such as bar coating, comma coating, inkjet coating or spin coating.

The method for manufacturing the liquid crystal element may also include forming a resin layer on a second substrate, and stacking the second substrate on the first substrate such that the resin layer is in contact with a convex part of the mold layer. The resin layer may be formed, for example, by coating a composition for the resin layer including a polymerizable or crosslinkable compound, a curable compound and/or a vertically-aligned polymer on the second substrate. A method for coating the composition for the resin layer is not particularly limited, and may be carried out by a known coating method, for example, roll coating, printing, inkjet coating, slit nozzling, bar coating, comma coating, spin coating or gravure coating. In this case, when the composition for the resin layer includes a solvent, the resin layer may be dried under suitable conditions to volatilize the solvent, or partially cured by applying suitable energy capable of inducing crosslinking or polymerization.

The method for manufacturing the liquid crystal element may also include applying suitable energy, for example, light capable of inducing crosslinking, polymerization or curing after the second substrate is stacked on the first substrate. Here, the crosslinking or polymerization may encompass crosslinking or polymerization between crosslinkable or polymerizable compounds included in the mold layer and crosslinking or polymerization between crosslinkable or polymerizable compounds included in the resin layer. To this end, the resin layer and the mold layer may each be completely crosslinked or polymerized.

Also, the crosslinking or polymerization may refer to crosslinking or polymerization between a crosslinkable or polymerizable compound present in the resin layer and a crosslinkable compound present in a convex part of the mold layer or a liquid crystal region. In this case, as the resin layer and the convex part of the mold layer may be maintained in a contact state due to crosslinks, the first substrate and the second substrate may have an adhesive strength suitable for forming a liquid crystal cell, the concave part of the mold layer and the resin layer may properly form a barrier rib for separating the liquid crystal compound. Accordingly, since the liquid crystal element of the present application may suitably maintain the initial alignment state without flowing down the liquid crystal compound even in a normally transparent mode, a roll-to-roll process is possibly performed after manufacturing, and a high contrast ratio may be exhibited even with a low driving voltage.

The present application also relates to a use of the liquid crystal element. The liquid crystal element may realize a normally transparent mode, have a high contrast ratio, and is able to be driven with a low voltage. Such a liquid crystal element may be applied, for example, in a light modulator. The light modulator may be, but is not limited to, a smart window, a window protective film, a flexible display element, an active retarder for displaying a 3D image or a viewing angle controlling film. A method for constituting such a light modulator is not particularly limited, and any conventional method using the liquid crystal element may be applied.

Advantageous Effects

A liquid crystal element of the present application is an element that can realize, for example, a normally transparent mode, can exhibit a high contrast ratio, and can be driven with a low driving voltage. Such a liquid crystal element can be applied in a variety of light modulators including a smart window, a window protective film, a flexible display element, an active retarder for displaying a 3D image and a viewing angle controlling film.

MODES OF THE INVENTION

Hereinafter, the above descriptions will be explained in further detail with reference to examples and comparative examples, but the scope of the present application is not limited by the following descriptions.

Measurement Example 1. Measurement of Surface Energy

Surface energy was measured using a drop-shape analyzer (DSA100 manufactured by KRUSS). An average was obtained from five values of contact angles obtained by repeating a procedure for measuring a contact angle by dropping deionized water having a known surface tension onto a test sample five times, and an average was obtained from five values of contact angles obtained using diiodomethane having a known surface tension in the same manner as used above. Afterward, using the average values of the contact angles for deionized water and diiodomethane, surface energy was calculated by substituting a value (Strom value) of the surface tension of a solvent according to the Owens-Wendt-Rabel-Kaelble method. The surface energy ($\gamma^{surface}$) of the sample may be calculated by considering a dispersion force between non-polar molecules and an interactive force between polar molecules ($\gamma^{surface} = \gamma^{dispersion} + \gamma^{polar}$) and in the surface energy ($\gamma^{surface}$), a ratio of the polar term ($\gamma^{polar}$) may be defined as a polarity of the surface.

Measurement Example 2. Measurement of Surface Roughness

A surface roughness may be measured by measuring an AFM Z-scale surface roughness (arithmetic average roughness, Ra) using a multimode AFM instrument manufactured by Bruker (Measurement Conditions: Parameter—Mode: ScanAsyst in air, Samples/line: 512×512, Scan rate: 0.7 Hz, AFM probe: Silicon tip on nitride lever w/Al coating (Bruker), Material: Silicon Nitride, Resonance Frequency: 50-90 kHz, Force Constant: 0.4 N/m, Thickness: 0.65 μm, Length: 115±10 μm, Width: 25 μm, Tip height: 5 μm, Software-Nanoscope 8.15)

Reference 1

Two base films each having an ITO layer deposited on a polycarbonate (PC) film were placed to face each other such that the ITO layers were placed inside, and a liquid crystal composition (7306, HCCH) was injected thereinto to have a thickness of approximately 3 to 30 thereby manufacturing a liquid crystal cell.

Reference 2

Two base films each obtained by depositing an ITO layer on a PC film and performing corona treatment were placed to face each other such that the ITO layers were placed inside, and a liquid crystal composition (7306, HCCH) was injected thereinto to have a thickness of approximately 3 to 30 thereby manufacturing a liquid crystal cell.

Reference 3

Two base films each obtained by depositing an ITO layer on a polyethyleneterephthalate (PET) film and transferring an Si-adhesive manufactured by Daipo Paper to the ITO layer to have a thickness of approximately 7 to 50 μm were placed to face each other such that adhesive layers were placed inside, and a liquid crystal composition (7306, HCCH) was injected thereinto to have a thickness of approximately 3 to 30 thereby manufacturing a liquid crystal cell.

Reference 4

Two base films each obtained by depositing an ITO layer on a PC film and forming an SiOx-based barrier layer on the ITO layer were placed to face each other such that the barrier layers were placed inside, and a liquid crystal composition (7306, HCCH) was injected thereinto to have a thickness of approximately 3 to 30 thereby manufacturing a liquid crystal cell.

Reference 5

Two base films each obtained by forming a hard coating layer on a PC film were placed to face each other such that the hard coating layers were placed inside, and a liquid crystal composition (7306, HCCH) was injected thereinto to have a thickness of approximately 3 to 30 μm, thereby manufacturing a liquid crystal cell.

Reference 6

Two base films each obtained by depositing an ITO layer on a PET film and transferring a 3193H adhesive manufactured by Henkel to the ITO layer to have a thickness of approximately 1 to 5 μm such that the adhesive layers were placed inside, and a liquid crystal composition (7306, HCCH) was injected thereinto to have a thickness of approximately 3 to 30 μm, thereby manufacturing a liquid crystal cell.

Figure 3:
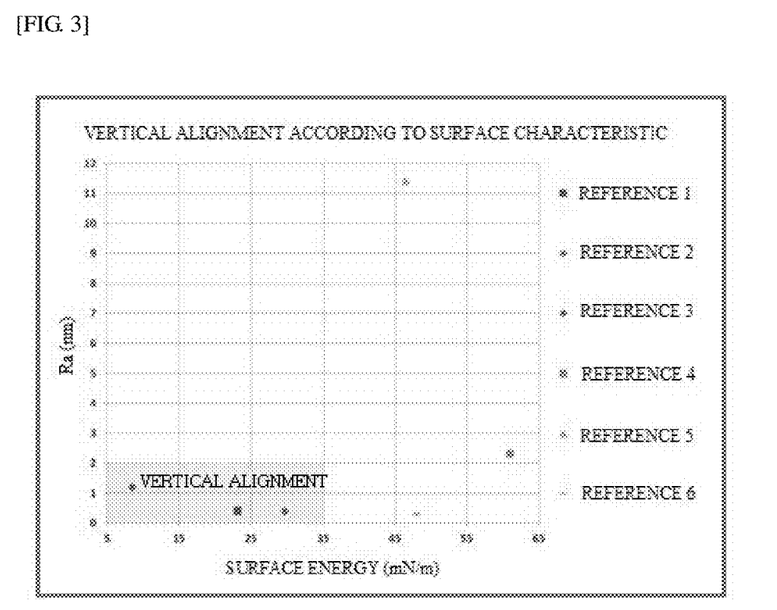
FIG. 3 shows vertical alignment of liquid crystals according to surface characteristics of base films of References 1 to 6.

Evaluation Example 1. Evaluation of Vertical Alignment According to Surface Characteristic Surface energy and surface roughness were measured on the base films manufactured in References 1 to 6 by the above methods described above, and the results are shown in FIG. 3 and Table 1. Vertical alignment was evaluated with respect to the liquid crystal cells manufactured in References 1 to 6, and the results are shown in Table 1. Specifically, the surface energy and surface roughness may be measured by Measurement Examples 1 and 2, respectively, and when the liquid crystal cell was observed at the front (incident angle: 0°), if the specular transmittance is 55% or more, it was evaluated to be vertically aligned. As shown in FIG. 3 and Table 1, it can be seen that, when the base film has a surface energy of 45 mN/m or less and a surface roughness of 2 nm or less, a liquid crystal cell using the above base films as upper and lower base films may effectively induce vertical alignment of liquid crystals.

TABLE 1

|  | Surface energy (mN/m) | Surface roughness (Ra, nm) | Transmittance(%) | Vertical alignment |
|---|---|---|---|---|
| Reference 1 (PC-ITO) | 23.1 | 0.4 | 66 | ○ |
| Reference 2 (PC-ITO_C) | 29.7 | 0.4 | 65 | ○ |
| Reference 3 (Si-A) | 8.5 | 1.3 | 69 | ○ |
| Reference 4 (Barrier) | 61.0 | 2.3 | 48 | X |
| Reference 5 (H/C) | 46.5 | 11.4 | 45 | X |
| Reference 6 (3193HS) | 47.9 | 0.3 | 52 | X |

Example 1

A honeycomb-type pattern was formed by coating a composition for an acrylic mold layer (Trade Name: KAD-03, Manufacturer: MINUTA Tech.) on an ITO layer of a PET film (100 mm×100 mm) (hereinafter, referred to as a first substrate) on which the ITO transparent electrode layer was deposited, and performing an imprinting method (width of a convex part of the pattern: 10 μm~50 μm, height of the convex part: 3 μm~20 μm, width of a concave part: 300 μm~750 μm). Subsequently, a liquid crystal composition including 2 g of a liquid crystal compound (7306, HCCH) and 20 mg of a dichroic dye (X12, BASF) was coated on the imprinted mold layer. Afterward, an Si-Adhesive manufactured by Daipo Paper as a resin layer was transferred onto a PET film (100 mm×100 mm) on which an ITO transparent electrode layer is deposited (hereinafter, referred to as a second substrate) to have a thickness of approximately 10 Subsequently, the second substrate was stacked on the first substrate such that the resin layer was in contact with the concave part of the mold layer, and light was applied under conditions of Fusion UV 70% 3 m/min, thereby manufacturing a liquid crystal element.

Comparative Example 1

A liquid crystal element of Comparative Example 1 was manufactured by the same method as described in Example 1, except that a 3193H adhesive manufactured by Henkel, instead of an Si-adhesive manufactured by Daipo Paper, as a resin layer, was transferred onto a second substrate to have a thickness of approximately 3 μm.

Figure 4:
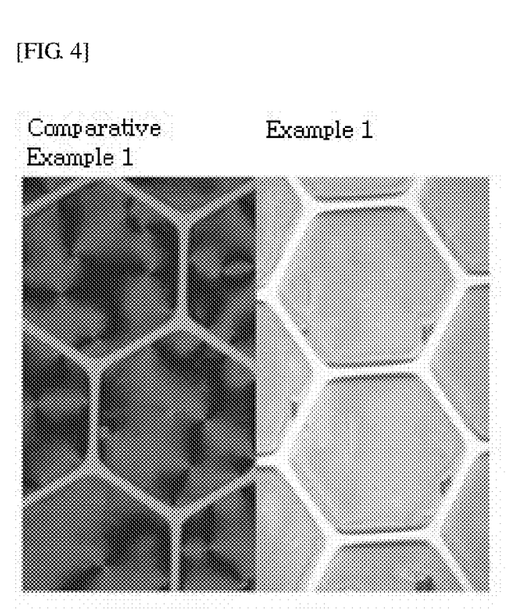
FIG. 4 is an OM image showing vertical alignment of Example 1 and Comparative Example 1.

Evaluation Example 2. Evaluation of Vertical Alignment of Liquid Crystal Element According to Example and Comparative Example The liquid crystal elements manufactured in Example 1 and Comparative Example 1 were observed by a microscope (OM), which are shown in FIG. 4. As shown in FIG. 4, it can be confirmed that, in the case of Comparative Example 1, since liquid crystals and dyes are not vertically aligned, a domain is formed and looks dark. However, in the case of Example 1, since liquid crystals and dyes are vertically aligned, a domain is not observed, and looks brighter.

Evaluation Example 3. Evaluation of Adhesive Strength

Figure 5:
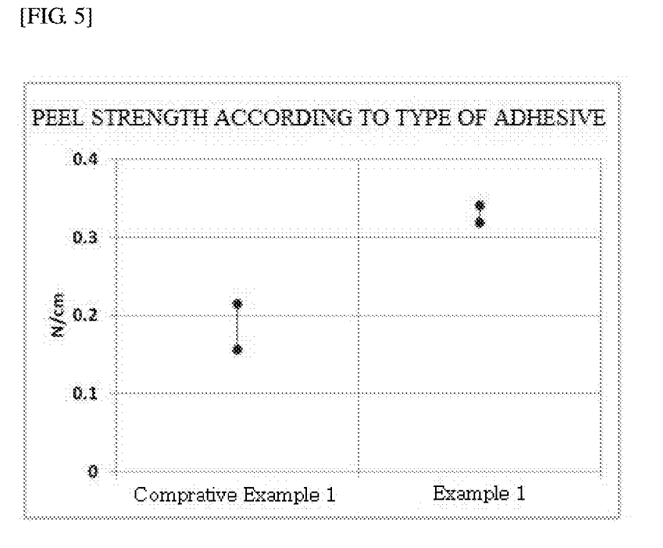
FIG. 5 shows evaluation results for peel strengths of Example 1 and Comparative Example 1.

Adhesive strengths were evaluated by measuring 90-degree peel strengths of the resin layer and the mold layer on the liquid crystal elements manufactured in Example 1 and Comparative Example 1 using a texture analyzer, which are shown in FIG. 5 and Table 1. As shown in FIG. 5, it can be seen that Example 1 has an excellent adhesive strength, compared to Comparative Example 1.

Evaluation Example 4. Evaluation of Transmittance

Figure 6:
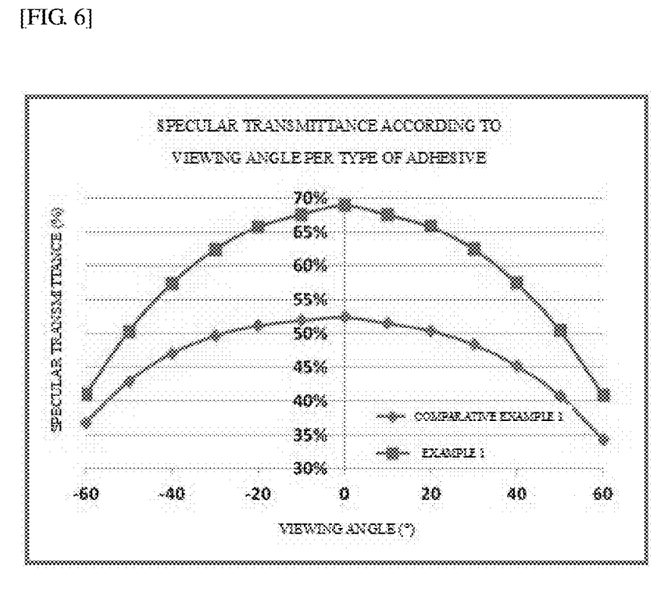
FIG. 6 shows evaluation results for specular transmittances according to a viewing angle of Example 1 and Comparative Example 1.
Figure 7:
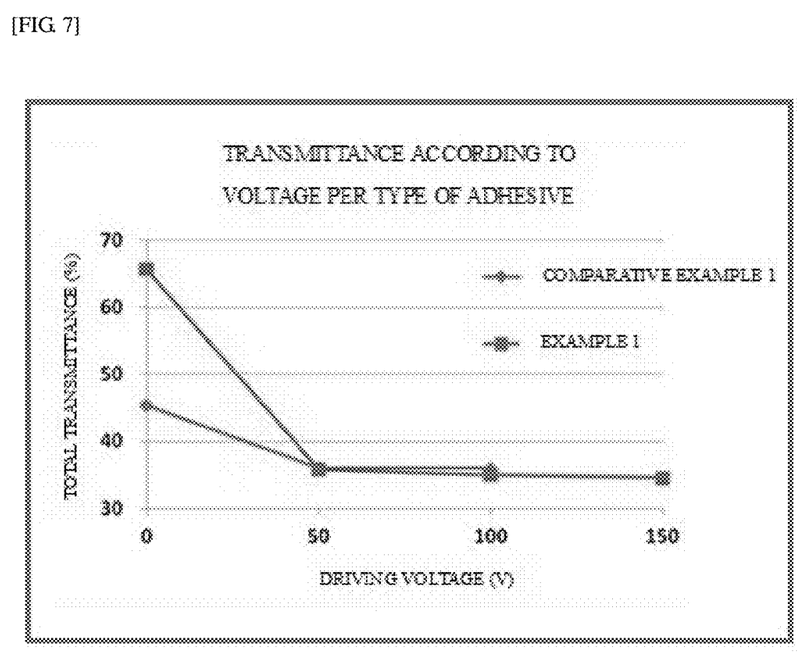
FIG. 7 shows evaluation results for total transmittances according to a driving voltage of Example 1 and Comparative Example 1.

A specular transmittance according to a viewing angle in a state in which a voltage was not applied was evaluated with respect to the liquid crystal elements manufactured in Example 1 and Comparative Example 1, which is shown in FIG. 6, and a total transmittance according to a driving voltage at the front was evaluated, which is shown in FIG. 7. The specific transmittance according to a viewing angle was evaluated by measuring a change in specular transmittance according to an angle of light incident to the liquid crystal element using LCMS-200 equipment, and to evaluate the transmittance according to the application of a voltage, a total transmittance according to a voltage applied by driving an AC power source connected to an ITO layer of the upper and lower ITO-PET films was measured using a hazemeter (NDH-5000SP). As shown in FIG. 7, the liquid crystal element of Example 1 has a high transmittance when a voltage is not applied, and has a low transmittance when a voltage is applied, and thereby, it can be seen that the liquid crystal element realizes a normally transparent mode. Also, as shown in FIG. 6, it can be seen that the liquid crystal element of Example 1 has a high transmittance, that is, an excellent vertical alignment state at the front and viewing angle, compared with the liquid crystal element of Comparative Example 1.

The invention claimed is:
1. A liquid crystal element, comprising:
a first substrate on which a mold layer having a convex part and a concave part is formed;
a second substrate on which a resin layer having a surface energy of 45 mN/m or less an AFM Z-scale surface roughness of 2 nm or less and a pressure-sensitive adhesive strength is formed to be in contact with the convex part of the mold layer; and
a liquid crystal compound present in the concave part of the mold layer and being in contact with the resin layer such that the resin layer effectively induce vertical alignment to liquid crystals,
wherein the resin layer and the convex part of the mold layer are in contact with each other by the pressure-sensitive adhesive strength of the resin layer, or cross-linked with each other,
the mold layer further includes a surface which is entirely in contact with and covering the first substrate, and
the resin layer comprises a curable silicone compound.
2. The element of claim 1, wherein the mold layer or the resin layer satisfies General Equation 1 below:

$$0 \leq |Y - \{1 \times 10^{-4} X^{-3} - 1.2 \times 10^{-3} X^{-2} + 3.1 \times 10^{-3} X - 1.6 \times 10^{-3}\}| \leq 0.05 \quad \text{[General Equation 1]}$$

where X is an AFM Z-scale surface roughness of the mold layer or the resin layer, and Y is a surface polarity of the mold layer or the resin layer (however, the surface roughness and the surface polarity of the mold layer are values measured with respect to the surface of the mold layer in which the convex part and the concave part are not formed).

3. The element of claim 1, wherein the resin layer includes a polymerizable or crosslinkable compound or a curable compound.

4. The element of claim 3, wherein the polymerizable or crosslinkable compound is an acrylate compound.

5. The element of claim 3, wherein the mold layer or the resin layer further includes an additive capable of inducing vertical alignment.

6. The element of claim 5, wherein the additive includes a vertically-aligned polymer containing chlorine (Cl), fluorine (F) or silicon (Si).

7. The element of claim 1, wherein, in an initial state, the liquid crystal element has an in-plane retardation of 30 nm or less, or a retardation in a thickness direction of 500 nm or more.

8. The element of claim 1, which has a transmittance of 45% or more with respect to light having a wavelength of 400 to 700 nm, and a haze of 10% or less in an initial state.

9. The element of claim 8, which is switched to a scattering mode in which a transmittance of less than 45% with respect to light having a wavelength of 400 to 700 nm, and a haze of more than 10% due to the application of external energy.

10. A method of manufacturing a liquid crystal element, comprising:
injecting a liquid crystal compound into a concave part of a first substrate on which a mold layer having a convex part and a concave part is formed, and stacking a second substrate on which a resin layer having a surface energy of 45 mN/m or less, an AFM Z-scale surface roughness of 2 nm or less and a pressure-sensitive adhesive strength is formed on the first substrate to be in contact with the convex part of the mold layer so that the liquid crystal compound is in contact with the resin layer such that the resin layer effectively induce vertical alignment to liquid crystals,
wherein the resin layer and the convex part of the mold layer are in contact with each other by the pressure-sensitive adhesive strength of the resin layer, or cross-linked with each other, and
the mold layer further includes a surface which is entirely in contact with and covering the first substrate.

11. The method of claim 10, wherein the convex part and the concave part of the mold layer are formed by an imprinting method.

12. A light modulator comprising the liquid crystal element of claim 1.

13. A liquid crystal element, comprising:
a first substrate on which a mold layer having a convex part and a concave part is formed;
a second substrate on which a resin layer having a surface energy of 45 mN/m or less an AFM Z-scale surface roughness of 2 nm or less and a pressure-sensitive adhesive strength is formed to be in contact with the convex part of the mold layer; and
a liquid crystal compound present in the concave part of the mold layer and being in contact with the resin layer such that the resin layer effectively induce vertical alignment to liquid crystals,
wherein the resin layer and the convex part of the mold layer are in contact with each other by the pressure-sensitive adhesive strength of the resin layer, or cross-linked with each other,
the mold layer further includes a surface which is entirely in contact with and covering the first substrate, and
the resin layer is a single layer in contact with both the liquid crystal compound and the convex part of the mold layer.

14. The element of claim 13, wherein the resin layer includes a polymerizable or crosslinkable compound or a curable compound.

15. The element of claim 13, wherein the polymerizable or crosslinkable compound is an acrylate compound.

16. The element of claim 13, wherein the resin layer further includes an additive capable of inducing vertical alignment.

17. The element of claim 16, wherein the additive includes a vertically-aligned polymer containing chlorine (Cl), fluorine (F) or silicon (Si).

18. A liquid crystal element, comprising:
a first substrate on which a mold layer having a convex part and a concave part is formed;
a second substrate on which a resin layer having a surface energy of 45 mN/m or less an AFM Z-scale surface roughness of 2 nm or less and a pressure-sensitive adhesive strength is formed to be in contact with the convex part of the mold layer; and
a liquid crystal compound present in the concave part of the mold layer and being in contact with the resin layer such that the resin layer effectively induce vertical alignment to liquid crystals,
wherein the resin layer and the convex part of the mold layer are in contact with each other by the pressure-sensitive adhesive strength of the resin layer, or cross-linked with each other,
the mold layer further includes a surface which is entirely in contact with and covering the first substrate,
the resin layer comprises a curable silicone compound, and
the resin layer is a single layer in contact with both the liquid crystal compound and the convex part of the mold layer.

19. The element of claim 18, wherein the resin layer includes a polymerizable or crosslinkable compound or a curable compound.

20. The element of claim 19, wherein the polymerizable or crosslinkable compound is an acrylate compound.

21. The element of claim 19, wherein the resin layer further includes an additive capable of inducing vertical alignment.

22. The element of claim 21, wherein the additive includes a vertically-aligned polymer containing chlorine (Cl), fluorine (F) or silicon (Si).

* * * * *